US011243944B2

(12) United States Patent
Zhang et al.

(10) Patent No.: US 11,243,944 B2
(45) Date of Patent: Feb. 8, 2022

(54) DYNAMIC SEMANTIC NETWORKS FOR LANGUAGE UNDERSTANDING AND QUESTION ANSWERING

(71) Applicant: Futurewei Technologies, Inc., Plano, TX (US)

(72) Inventors: Jun Zhang, Cambridge, MA (US); Lifeng Liu, Sudbury, MA (US); Yingxuan Zhu, Cambridge, MA (US); Xiaotian Yin, Belmont, MA (US); Jian Li, Austin, TX (US)

(73) Assignee: Futurewei Technologies, Inc., Plano, TX (US)

( * ) Notice: Subject to any disclaimer, the term of this patent is extended or adjusted under 35 U.S.C. 154(b) by 472 days.

(21) Appl. No.: 15/637,405

(22) Filed: Jun. 29, 2017

(65) Prior Publication Data

US 2019/0005090 A1 Jan. 3, 2019

(51) Int. Cl.
*G06F 16/242* (2019.01)
*G06F 16/22* (2019.01)
*G06F 16/33* (2019.01)
*G06F 16/332* (2019.01)
*G06F 40/30* (2020.01)

(52) U.S. Cl.
CPC ...... *G06F 16/2425* (2019.01); *G06F 16/2237* (2019.01); *G06F 16/3329* (2019.01); *G06F 16/3338* (2019.01); *G06F 40/30* (2020.01)

(58) Field of Classification Search
USPC ........................................................ 707/721
See application file for complete search history.

(56) References Cited

U.S. PATENT DOCUMENTS

| | | | |
|---|---|---|---|
| 2004/0073547 A1* | 4/2004 | Hamilton | G06F 16/38 |
| 2012/0254188 A1* | 10/2012 | Koperski | G06F 16/285 |
| | | | 707/740 |
| 2016/0034512 A1* | 2/2016 | Singhal | G06F 16/35 |
| | | | 707/737 |
| 2016/0300252 A1* | 10/2016 | Frank | G06Q 30/0203 |
| 2016/0358072 A1* | 12/2016 | Hermann | G06N 3/0427 |
| 2017/0024645 A1* | 1/2017 | Socher | G06F 16/3329 |

(Continued)

OTHER PUBLICATIONS

Andreas, Jacob, et al., "Learning to Compose Neural Networks for Question Answering", *Proceedings of NAACL-HLT 2016*, (2016), 1545-1554.

(Continued)

*Primary Examiner* — Hosain T Alam
*Assistant Examiner* — Nicholas E Allen
(74) *Attorney, Agent, or Firm* — Schwegman Lundberg & Woessner, P.A.

(57) ABSTRACT

A computer-implemented method of answering questions comprises: receiving, by one or more processors, a query; based on the query, generating, by the one or more processors, a matrix; based on the matrix, modifying, by the one or more processors, a dynamic memory; based on the matrix, determining, by the one or more processors, a first response from the dynamic memory; based on the matrix, determining, by the one or more processors, a second response from a database; based on the first response and the second response, determining, by the one or more processors, a third response; and in response to the query, providing, by the one or more processors, the third response.

17 Claims, 5 Drawing Sheets

(56) References Cited

U.S. PATENT DOCUMENTS

| | | | |
|---|---|---|---|
| 2017/0060844 A1* | 3/2017 | He | G06F 16/3329 |
| 2017/0103324 A1* | 4/2017 | Weston | G06N 5/04 |
| 2017/0124447 A1* | 5/2017 | Chang | G06F 16/3334 |
| 2017/0169332 A1* | 6/2017 | Graves | G06N 3/04 |
| 2017/0169360 A1* | 6/2017 | Veeramachaneni | G06F 21/56 |
| 2017/0177675 A1* | 6/2017 | Beller | G06F 16/90332 |
| 2017/0180276 A1* | 6/2017 | Gershony | H04L 51/20 |

OTHER PUBLICATIONS

Andreas, Jacob, et al., "Neural Module Networks", *CVPR*, (2016), 39-48.

Bahdanau, Dzmitry, et al., "Neural Machine Translation by Jointly Learning to Align and Translate", arXiv:1409.0473V7, *International Conference on Representation Learning*, (2015), 1-15.

Graves, Alex, et al., "Neural Turing Machines", arXiv:1410.5401 v2 [cs.NE], Cornell University Library, (2014), 1-26.

Kalchbrenner, Nal, et al., "Recurrent Continuous Translation Models", *Proceedings of the 2013 Conference on Empirical Methods in Natural Language Processing*, Seattle, Washington, USA, Oct. 18-21, 2013, (2013), 1700-1709.

Sukhbaatar, Sainbayar, et al., "End-to-End Memory Networks", arXiv:1503.08895v5 [cs.NE], Cornell University Library, *NIPS*, (2015), 1-11.

Weston, James, "Dialog-based Language Learning", arXiv:1604.06045v7 [cs.CL], Cornell University Library, (2016), 1-10.

\* cited by examiner

DYNAMIC SEMANTIC NETWORKS FOR LANGUAGE UNDERSTANDING AND QUESTION ANSWERING

TECHNICAL FIELD

The present disclosure is related to question-answering engines and, in one particular embodiment, to dynamic semantic networks for language understanding and question answering.

BACKGROUND

Existing solutions for understanding natural language and answering questions either rely on massive amounts of annotated data to train many domain-specific intents or rely on handcrafted rules. These solutions are generally expensive, hard to manage, do not incorporate context information, and perform poorly on interactive dialogue.

A neural Turing machine may encode information received using a distributed word representation of the received information encoded by a deep recurrent neural network. The neural Turing machine may provide answers to questions using the encoded data. This model bases computations on a distributed word representation and encodes semantic meanings of sentences using a deep recurrent neural network.

A long short-term memory (LSTM) is a recurrent neural network that can learn from experience. A LSTM comprises a set of LSTM cells. Each LSTM cell provides an output based on an input and one or more internal states. Compared with other recurrent neural networks, LSTMs tend to be better at remembering values for long or short periods of time because LSTMs do not use an activation function within the recurrent components. As a result, stored values within the LSTM cells do not inherently degrade over time. LSTMs find application in, among other things, natural-language text compression, handwriting recognition, and automatic speech recognition.

SUMMARY

Various examples are now described to introduce a selection of concepts in a simplified form that are further described below in the Detailed Description. The Summary is not intended to identify key or essential features of the claimed subject matter, nor is it intended to be used to limit the scope of the claimed subject matter.

According to one aspect of the present disclosure, a computer-implemented method of answering questions is provided that comprises: receiving, by one or more processors, a query; based on the query, generating, by the one or more processors, a matrix; based on the matrix, modifying, by the one or more processors, a dynamic memory; based on the matrix, determining, by the one or more processors, a first response from the dynamic memory; based on the matrix, determining, by the one or more processors, a second response from a database; based on the first response and the second response, determining, by the one or more processors, a third response; and in response to the query, providing, by the one or more processors, the third response.

Optionally, in any of the preceding aspects, the query comprises a plurality of words; and the generating of the matrix comprises determining a vector for each word of the plurality of words.

Optionally, in any of the preceding aspects, the vector for each word of the plurality of words has at least one hundred dimensions; and the determining of the vector for each word of the plurality of words comprises retrieving a predetermined corresponding vector for the word from a database.

Optionally, in any of the preceding aspects, the determining of the first response from the dynamic memory comprises: providing the matrix as input to a long short-term memory (LSTM); and in response to the input, receiving the first response from the LSTM.

Optionally, in any of the preceding aspects, the method further comprises: determining an interpolation gate factor using a training set; and the determining of the third response is further based on the interpolation gate factor.

Optionally, in any of the preceding aspects, the method further comprises: accessing an initial database that stores representations of facts as triplets, each triplet comprising a head entity, a relation, and a tail entity; and generating the database from the initial database by performing operations comprising, for each triplet in the initial database: generating a first vector based on the head entity and the relation; generating a second vector based on the tail entity; and storing the first vector and the second vector as a key-value pair, wherein the first vector is the key and the second vector is the value.

Optionally, in any of the preceding aspects, the determining of the second response from the database comprises determining a cosine similarity between the matrix and one or more keys of the database.

Optionally, in any of the preceding aspects, the determining of the second response from the database further comprises comparing each determined cosine similarity to a predetermined threshold.

According to one aspect of the present disclosure, a question-answering system is provided that comprises: a memory storage comprising instructions; and one or more processors in communication with the memory storage, wherein the one or more processors execute the instructions to perform: receiving a query; based on the query, generating a matrix; based on the matrix, modifying a dynamic memory; based on the matrix, determining a first response from the dynamic memory; based on the matrix, determining a second response from a database; based on the first response and the second response, determining a third response; and in response to the query, providing the third response.

Optionally, in any of the preceding aspects, the query comprises a plurality of words; and the generating of the matrix comprises determining a vector for each word of the plurality of words.

Optionally, in any of the preceding aspects, the vector for each word of the plurality of words has at least one hundred dimensions; and the determining of the vector for each word of the plurality of words comprises retrieving a predetermined corresponding vector for the word from a database.

Optionally, in any of the preceding aspects, the determining of the first response from the dynamic memory comprises: providing the matrix as input to a long short-term memory (LSTM); and in response to the input, receiving the first response from the LSTM.

Optionally, in any of the preceding aspects, the one or more processors further perform: determining an interpolation gate factor using a training set; and the determining of the third response is further based on the interpolation gate factor.

Optionally, in any of the preceding aspects, the one or more processors further perform: accessing an initial database that stores representations of facts as triplets, each triplet comprising a head entity, a relation, and a tail entity;

and generating the database from the initial database by performing operations comprising, for each triplet in the initial database: generating a first vector based on the head entity and the relation; generating a second vector based on the tail entity; and storing the first vector and the second vector as a key-value pair, wherein the first vector is the key and the second vector is the value.

Optionally, in any of the preceding aspects, the determining of the second response from the database comprises determining a cosine similarity between the matrix and one or more keys of the database.

Optionally, in any of the preceding aspects, the determining of the second response from the database further comprises comparing each determined cosine similarity to a predetermined threshold.

Optionally, in any of the preceding aspects, the modifying of the dynamic memory comprises applying a weighting function; and the one or more processors further perform: determining a next value of the weighting function by convolving the weighting function with a shifting distribution.

According to one aspect of the present disclosure, a non-transitory computer-readable medium is provided that stores computer instructions for answering questions, that when executed by one or more processors, cause the one or more processors to perform steps of: receiving a query; based on the query, generating a matrix; based on the matrix, modifying a dynamic memory; based on the matrix, determining a first response from the dynamic memory; based on the matrix, determining a second response from a database; based on the first response and the second response, determining a third response; and in response to the query, providing the third response.

Optionally, in any of the preceding aspects, the query comprises a plurality of words; and the generating of the matrix comprises determining a vector for each word of the plurality of words.

Optionally, in any of the preceding aspects, the vector for each word of the plurality of words has at least one hundred dimensions; and the determining of the vector for each word of the plurality of words comprises retrieving a predetermined corresponding vector for the word from a database.

Any one of the foregoing examples may be combined with any one or more of the other foregoing examples to create a new embodiment within the scope of the present disclosure.

DETAILED DESCRIPTION

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized and that structural, logical, and electrical changes may be made without departing from the scope of the present disclosure. The following description of example embodiments is, therefore, not to be taken in a limiting sense, and the scope of the present disclosure is defined by the appended claims.

The functions or algorithms described herein may be implemented in software, in one embodiment. The software may consist of computer-executable instructions stored on computer-readable media or a computer-readable storage device such as one or more non-transitory memories or other types of hardware-based storage devices, either local or networked. The software may be executed on a digital signal processor, application-specific integrated circuit (ASIC), programmable data plane chip, field-programmable gate array (FPGA), microprocessor, or other type of processor operating on a computer system, such as a switch, server, or other computer system, turning such a computer system into a specifically programmed machine.

Methods and systems for dynamic semantic networks described herein may be able to provide answers in open-ended conversations while using less annotated data than prior solutions. In some example embodiments, new information is learned by the dynamic semantic network from the open-ended conversations. The dynamic semantic network may efficiently represent a context of a conversation, and can provide long-range memory of long sentences using state tracking which uses latent variables in the context. The dynamic semantic network may reduce the number of models used in deploying question-answering systems and may be able to combine a knowledge base with a dynamic memory to provide meaningful responses to complex questions.

The dynamic semantic network may include dynamic external memory for writing and reading as well as protected static memory for accessing standard external knowledge bases. Some examples of the types of questions to which the dynamic semantic network is able to respond include information-retrieval questions, reasoning questions, and mixed questions. An interpolation gate may be used to combine responses from static and dynamic sources.

Figure 1:
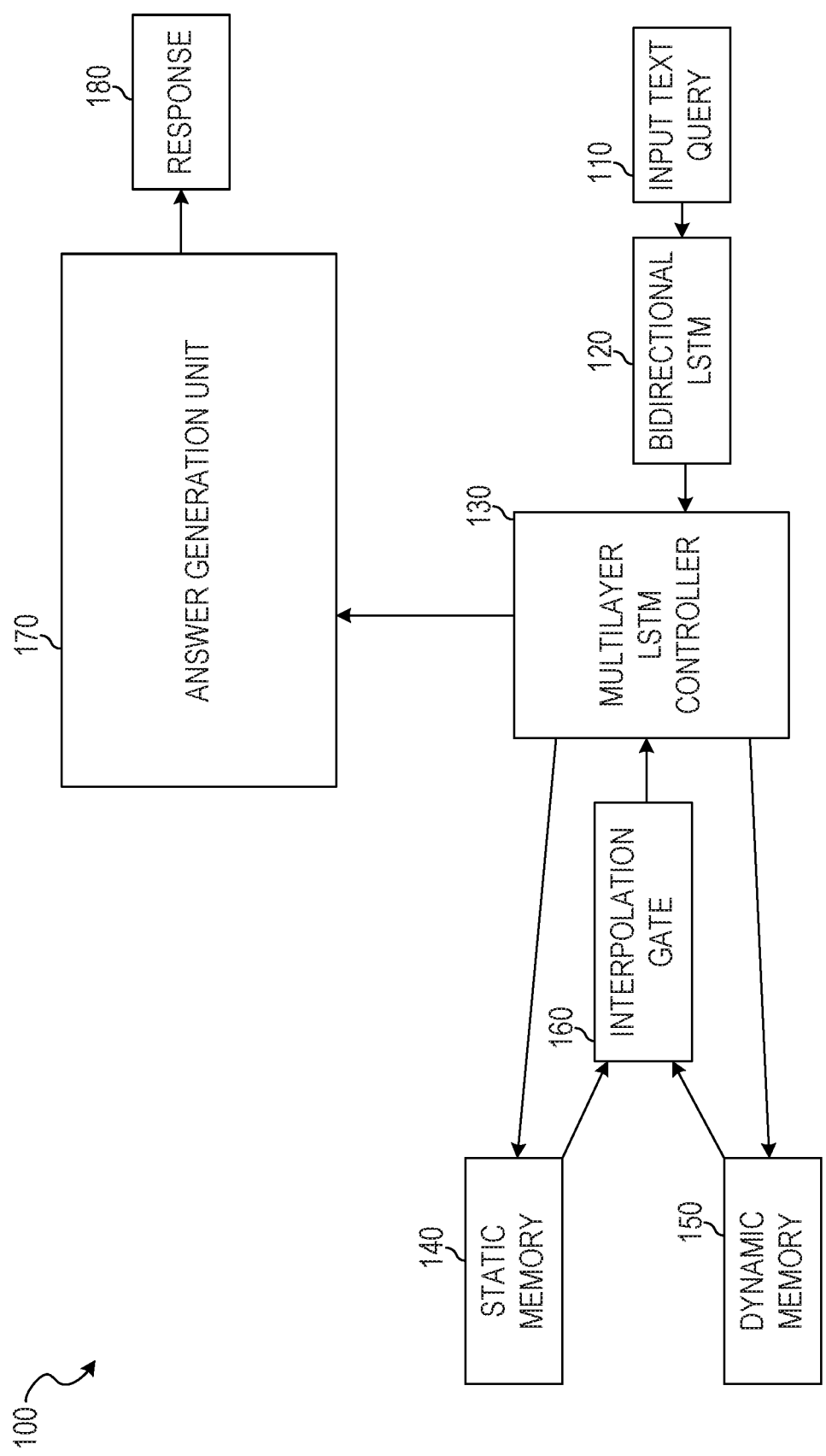
FIG. 1 is a data flow illustration of a dynamic semantic network for language understanding and question answering, according to some example embodiments.

FIG. 1 is a data flow illustration 100 of a dynamic semantic network for language understanding and question answering, according to some example embodiments. The data flow illustration 100 includes an input text query 110, a bidirectional LSTM 120, a multilayer LSTM controller 130, a static memory 140, a dynamic memory 150, an interpolation gate 160, an answer generation unit 170, and a response 180.

The input text query 110 is a natural-language text query. The input text query 110 may be received from a keyboard input device, from a voice input via a speech-to-text translator, or in another manner. For example, a device that includes a microphone and a wireless network adapter may record speech by a user and transmit the recording over a network to a server. The server may use a speech-to-text translator to generate the input text query 110.

The input text query 110 may be converted to a matrix. In some example embodiments, each word of the input text query 110 is converted to a vector of predetermined length (e.g., 100 dimensions or 300 dimensions) and the resulting vectors are arranged to form a matrix (e.g., a matrix with predetermined height and a width equal to the number of words in the input text query 110). For example, a vector of high dimensionality (i.e., at least one hundred dimensions) corresponding to each word in a dictionary may be stored in a database. The value of the vector can be visualized as a location in a high-dimensional space. Words in the input text query 110 that are not in the database may be ignored.

The matrix representing the input text query 110 is provided as an input to the bidirectional LSTM 120. The bidirectional LSTM 120 converts the matrix representing the input text query 110 to a vector that represents the semantic context of the input text query 110. The output vector from the bidirectional LSTM 120 has the same length as one of the input word vectors, but may not correspond to a dictionary entry. The location in the space indicated by the output vector may have a meaning corresponding to a blend of the meanings of words in the dictionary that have nearby locations.

The vector resulting from the bidirectional LSTM 120 is provided as an input to the multilayer LSTM controller 130. The multilayer LSTM controller 130, in a first layer, provides the vector to the static memory 140 and the dynamic memory 150.

The static memory 140 handles the input vector for reading, providing a response based on the contents of the input vector. In some example embodiments, the static memory 140 is implemented as a database. The database of the static memory 140 may be prepared from a fact database that stores representations of facts as triplets, each triplet comprising a head entity, a relation, and a tail entity. In some example embodiments, head entities are nouns, tail entities are nouns or adjectives, and relations are verbs. As another example, a fact showing that race cars are fast may be stored as a triplet that has a head entity representing the noun "race cars," a tail entity representing the adjective "fast," and a relation representing the verb "are." In other example embodiments, other values are allowed for relations. For example, a fact showing that two people are married may be stored as a triplet that has a head entity representing one spouse, a tail entity representing the other spouse, and a relation indicating the marriage. An entry in the database of the static memory 140 may be created for each triplet in the fact database.

To generate an entry in the database of the static memory 140 for a triplet in the fact database, a first vector may be generated based on the head entity and the relation. For example, the word or phrase of the head entity and the word or phrase of the relation may be used to look up vectors in a dictionary database. The vectors representing the head entity and the relation may be summed to generate the first vector. A second vector may be generated based on the tail entity by using the word or phrase of the tail entity to look up the second vector in the dictionary database. The fact represented by the triplet may be stored in the database of the static memory 140 as a key-value pair, wherein the first vector is the key and the second vector is the value. Thus, for any specific relation for any head entity (i.e., for any key), the corresponding facts can be retrieved as values. In some example embodiments, multiple values may be stored for the same key. For example, the relation "spouse" may have multiple entries for a person who has been married multiple times.

In some example embodiments, cosine similarity is used to determine whether a particular fact is responsive to a query. For example, for a given query sentence x, including j words $w_1, w_2, \ldots, w_j$, denote the encoded vector (e.g., output from the bidirectional LSTM 120) as q. The cosine similarity between the query x and a fact entry triplet (head, relation, tail) may be calculated as S(q, E(head+relation)), where (head+relation) is the concatenated string of the head entity and the relation, and E(head+relation) is the vector representation of (head+relation) used as a key in the database of the static memory 140. Thus, the words of head and relation may be converted to vectors using a dictionary lookup and the sequence of vectors provided as an input to the bidirectional LSTM 120 to generate a semantic context for the phrase resulting from their concatenation. For example, if the head is "Donald Trump" and the relation is "spouse," E(head+relation) would be the semantic context output from the bidirectional LSTM 120 in response to an input sequence of vectors representing the phrase "Donald Trump spouse." The function S( ) determines the cosine similarity between two vectors, and may be determined using the equation below, wherein the vectors have length n.

$$S(A, B) = \frac{\sum_{i=1}^{n} A_i B_i}{\sqrt{\sum_{i=1}^{n} A_i^2} \sqrt{\sum_{i=1}^{n} B_i^2}}$$

Two vectors will have a cosine similarity of 1 when they are identical, −1 when they are opposite, and 0 when they are orthogonal. In some example embodiments, a fact entry is compared to a query using cosine similarity and determined to be relevant if the cosine similarity exceeds a predetermined threshold (e.g., 0.1, 0.2, or 0.3). Thus, the cosine similarity between the query vector and each key value in the database of the static memory 140 may be determined and compared to a predetermined threshold to identify a set of relevant entries.

The dynamic memory 150 at discrete time t may be represented by a matrix $M_t$ of size N×d, where N is the total number of represented facts and d is the predetermined size for representing a word vector.

The dynamic memory 150 handles the input vector for erasing and writing, modifying the contents of the dynamic memory 150 based on the contents of the vector. The dynamic memory 150 also handles the input vector for reading, providing a response based on the contents of the vector.

Different weighting algorithms may be used for memory reading and writing. Additionally, the weight (either for reading or writing) may be based on a combination of a weight for content-based addressing and a weight for location-based addressing.

For content-based memory addressing, a cosine similarity between the controller output u and each dynamic memory slot vector $M_t(i)$ and $P_t(j)$, i=1, . . . , N; j=1, . . . , L is employed, where L is the number of entries in the dynamic memory. The cosine similarity for each dynamic memory slot vector $M_t(i)$ may be compared to a predetermined threshold, ε. Dynamic memory slot vectors with a cosine similarity less than ε may be ignored. The remaining dynamic memory slot vectors are referred to as $S_M$, the active memory set.

The multilayer LSTM controller 130 has multiple layers and thus multiple outputs. In some example embodiments, the initial input to the multilayer LSTM controller 130, $u_0$, is the input query vector q. The equations below may be used to determine the reading weight for each relevant fact in the static memory 140 and the dynamic memory 150. S represents the cosine similarity function, γ is a predetermined scaling factor (e.g., 5 or 10), and u represents the output vector from the multilayer LSTM controller 130.

$$w_{ct}^r(i) = \frac{e^{\gamma S(u, Mt(i))}}{\sum_k e^{\gamma S(u, Mt(k))} + \sum_j e^{\gamma S(u, Pt(j))}}, \text{ for } i \text{ in } S_M$$

$$w_{ct}^r(j) = \frac{e^{\gamma S(u, Pt(j))}}{\sum_k e^{\gamma S(u, Mt(k))} + \sum_k e^{\gamma S(u, Pt(j))}},$$

for $j$ in the static memory set $S_P$

Location-based memory addressing may be designed to facilitate iteration across memory locations and random jumps. Location-based memory may be used for reasoning and mathematical computations. For example, a statement such as "Let x be 100" may assign a value of 100 to a location named "x." Then a query such as "What is x plus 1?" may retrieve the data stored in "x" and perform the requested operation on the retrieved data. Location-based memory addressing may use an interpolating gate with a gated weight at time t defined by:

$$w_{gt} = g_t w_{ct} + (1 - g_t) w_{t-1}.$$

In the above equation, the value for $g_t$ may be determined by training prior to use in the dynamic semantic network. The results from the interpolating gate are convolved with a shifting distribution $s_t$, which defines the probability on the allowed position shift range. For example, the shifting distribution may indicate a 50% chance that the location is adjacent to an identified location, a 25% chance that the location is two slots away from the identified location, a 15% chance that the location is three slots away from the identified location, and a 10% chance that the location is four slots away from the identified location. Thus, in some example embodiments, $$w_t(i) = W_{gt} * s_t(i) = \sum_j w_{gt}(j) s_t(i-j).$$

The results from the convolution are normalized, and the final weight at location i and time t is denoted as $w_t^r(i)$.

The multilayer LSTM controller 130 may use a memory-writing weight when handling the input vector for erasing and writing. In some example embodiments, the memory-writing weight is obtained by ignoring the static memory component 140. The equation below may be used to determine the writing weight:

$$w_t^w(i) = \frac{e^{\gamma S(u, Mt(i))}}{\sum_k e^{\gamma S(u, Mt(k))}}.$$

The final writing weight is denoted as $w_t^w(i)$, for $i=1, \ldots, N$.

Once the writing weight vector is determined, the dynamic memory matrix $M_t$ may be updated using the equation below for each vector i of the N vectors in the matrix, where 1 represents a vector of all 1's, $e_t$ is the eraser vector, and $a_t$ is the writing vector. In some example embodiments, the input vector $u_t$, from the multilayer LSTM controller 130, is used as both $e_t$ and $a_t$.

$$M_t(i) = M_{t-1}(i)[1 - w_t^w(i) e_t] + w_t^w(i) a_t$$

As can be seen from the equation above, a memory $M_t(i)$ is completely removed only if $e_t$ and $w_t^w$ both equal 1 at the location. Additionally, a memory is untouched only if $a_t$ is 0 at the location or if the writing weight for the location is 0 (e.g., the location $M_{t-1}(i)$ has no relevance to the writing vector $a_t$).

In reading memory, at time t, a read weighting unit vector $w_t^r$ represents the temporal attention weights at all active locations in the static memory 140 and the dynamic memory 150. In some example embodiments, the read value from the static memory 140 at time t is given by the equation below, summing the values of the responsive facts multiplied by the weight for each respective fact. $V_j$ represents the $j^{th}$ value in the active fact list. The active fact list includes only the facts found to match the query (e.g., facts having a cosine similarity to the query that exceeds a predetermined threshold).

$$\sum_j w_t^r(j) V_j$$

The read value from the dynamic memory 150 at time t may be given by the equation below, summing the values of the responsive memory locations multiplied by the weight for each respective memory location.

$$\sum_i w_t^r(i) M(i)$$

The response from the static memory 140 and the response from the dynamic memory 150 are provided to the interpolation gate 160. The interpolation gate 160 blends the response provided by the static memory 140 with the response provided by the dynamic memory 150 to generate a blended response. The blended response from the interpolation gate 160 is provided to the multilayer LSTM controller 130.

In some example embodiments, the blended response at a time t may be determined using the equation below, where $u_t$ represents the blended response at time t; $u_{t-1}$ represents the output vector from the previous layer of the multilayer LSTM controller 130 (recalling that $u_0$ is just the semantic encoding of the original query); $w^r$ is a read weighting vector that represents the temporal attention weights at all active locations in both static and dynamic memory; $b_t$ is a weight that determines the mixture of static memory and dynamic memory; i iterates through the active rows of the dynamic memory matrix M; and j iterates through the active fact list. The value of $b_t$ may be determined using an error minimization algorithm during training of the interpolation gate 160.

$$u_t = u_{t-1} + (1 - b_t) \sum_i w_t^r(i) M(i) + b_t \sum_j w_t^r(j) V_j$$

The multilayer LSTM controller 130 includes multiple layers. In some example embodiments, two or four layers are used. In a one-layer embodiment, values are written for the query vector $u_0$ and then read for the query vector $u_0$ to generate a value $u_1$.

In a two-layer embodiment, values are written for the query vector $u_0$ and then read for the query vector $u_0$ to generate a value $u_1$. In the second layer, $u_1$ is used to write to the dynamic memory and read from dynamic memory and static memory (using the interpolation gate 160 to combine the results) to generate $u_2$. In the two-layer implementation, $u_2$ is the final output from the multilayer LSTM controller 130. In a three-layer implementation, the process is repeated a third time, providing $u_2$ as an input to the dynamic and static memories and receiving $u_3$ as an output from the interpolation gate 160. Thus, various numbers of layers may be used in various example embodiments.

In some example embodiments, back-propagation is used to train the bidirectional LSTM 120, the interpolation gate 160, or other components. The bidirectional LSTM 120 may be trained prior to the interpolation gate 160 and held to be unchanging during the training of the interpolation gate 160.

Output from the interpolation gate 160 is provided by the multilayer LSTM controller 130 to the answer generation unit 170, which generates the response 180. The response 180 may be provided as text in a user interface, provided as audio using a text-to-speech translator, or any suitable combination thereof. The answer generation unit 170 may be implemented using a gated recurrent neural network (RNN) to generate an answer sentence. The gated RNN unit (GRU) may have three input components: the output from the interpolation gate 160, the input text query 110 as encoded by the bidirectional LSTM 120, and the query sentence matrix that is a direct translation of the input text query 110. For example, the input to the gated RNN may be a vector of the predetermined dimensionality used to represent individual words of the input query. The encoding of each word of the query may be input to the gated RNN in order, followed by the semantic context of the query (output from the bidirectional LSTM 120), followed by the final output from the multilayer LSTM controller 130. The output of the answer generation unit 170 is a sequence of word vectors of the predetermined dimensionality. The length of the sequence is automatically determined by the GRU network. The word vectors correspond to words (e.g., using the dictionary database) and the sequence of words is the final answer to the received query.

Figure 2:
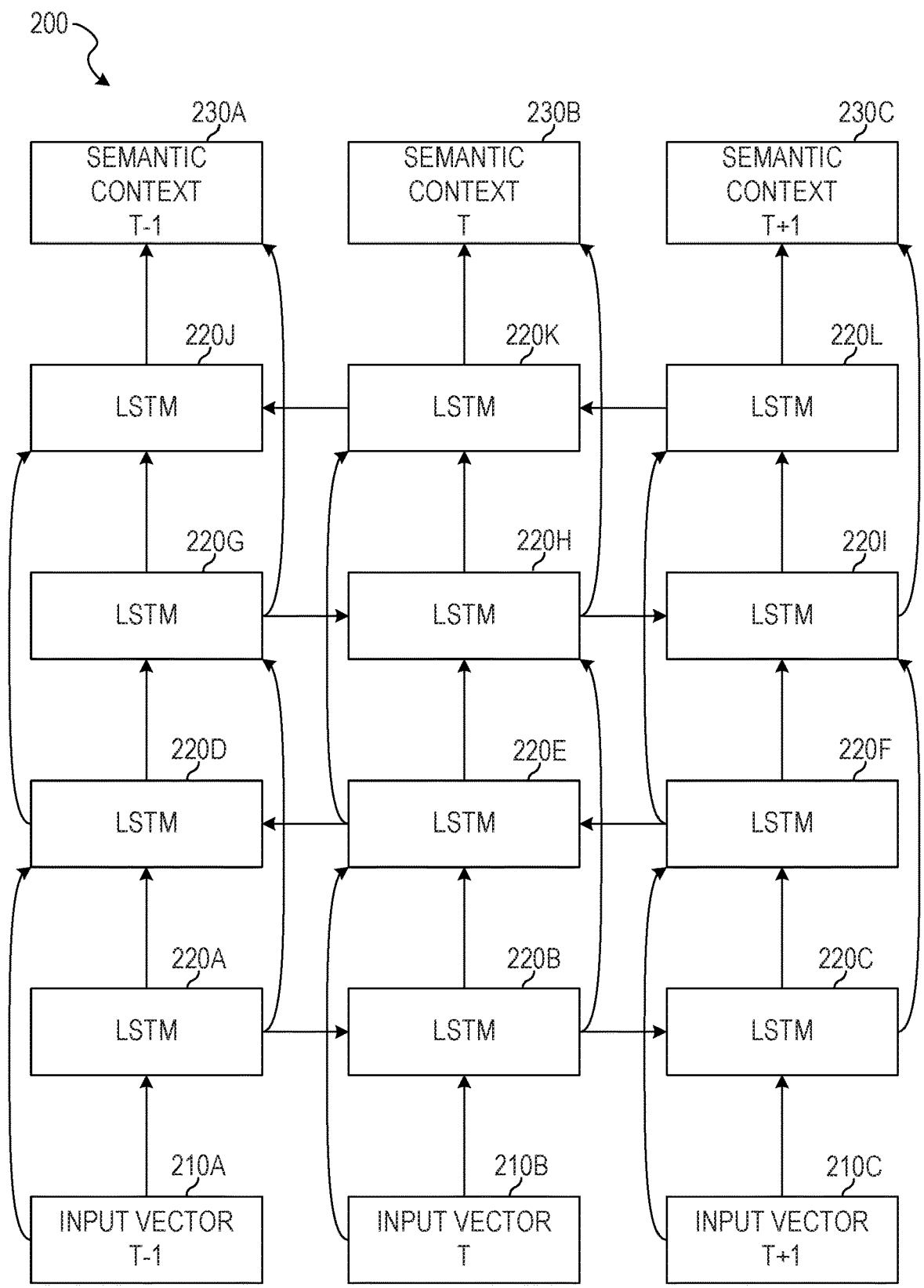
FIG. 2 is a block diagram illustration of a double-sided long short-term memory, according to some example embodiments.

FIG. 2 is a block diagram illustration of a double-sided long short-term memory (LSTM) 200, according to some example embodiments. The double-sided LSTM 200 comprises LSTM cells 220A, 220B, 220C, 220D, 220E, 220F, 220G, 220H, 220I, 220J, 220K, and 220L. Also shown in FIG. 2 are input vectors 210A, 210B, and 210C as well as outputs from the double-sided LSTM 200: semantic contexts 230A, 230B, and 230C. The input vectors 210A-210C may be referred to collectively as input vectors 210 or generically as an input vector 210. The LSTM cells 220A-220L may be referred to collectively as LSTM cells 220 or generically as an LSTM cell 220. The semantic contexts 230A-230C may be referred to collectively as semantic contexts 230 or generically as a semantic context 230. FIG. 2 shows three columns of LSTM cells 220 processing three input vectors 210 and generating three semantic contexts 230. In various example embodiments, more or fewer columns are used, allowing the processing of arbitrary numbers of input vectors 210.

In some example embodiments, each input vector 210 is a vector representing a word of a sentence. For example, an input query may be converted to a matrix, wherein each column of the matrix is a vector that represents one word of the sentence. Each column of the matrix is provided as an input vector 210.

As can be seen in the double-sided LSTM 200, the LSTM cells 220B and 220C are affected not only by the corresponding input vectors 210B and 210C, but also by the output of LSTM cells 220A and 220B, respectively. For example, the input vectors 210A-210C may be provided to the first two rows of LSTM cells 220A-220F in a first step. The resulting output of the LSTM cells 220A-220F may be provided to the LSTM cells 220B-220L in a second step. In a third step, the output of the LSTM cells 220B-220L may be provided to the LSTM cells 220C-220L. The process continues until no further changes occur within the LSTM cells 220. In some steps, multiple inputs are received by some cells. For example, in the second step, the LSTM cell 220E receives input from each of the LSTM cells 220B and 220F. In these instances, inputs may be resolved from bottom to top. Thus, the input from the LSTM cell 220B may be resolved before the input from the LSTM cell 220F.

As noted above, the output values of each of the LSTM cells 220A-220I is provided not only to the next LSTM cell in the column, but also to the LSTM cell after that and to an LSTM cell in an adjacent column. In this way, each input vector 210 (e.g., the input vector 210C) affects not only the corresponding semantic context 230 (e.g., the semantic context 230C), but also the other semantic contexts 230 (e.g., the semantic contexts 230A-230B).

The outputs from the last two rows of LSTM cells 220 (LSTM cells 220G-220L) are used to determine the semantic contexts 230. Each semantic context 230 is a vector that represents a location in the dictionary space used to represent the words of the input query. The semantic context 230 may be determined by averaging the final output values of the two input LSTM cells 220. For example, the semantic context 230C may be an average of the final output vectors of the LSTM cells 220I and 220L.

Prior to use in a dynamic semantic network, a double-sided LSTM may be trained using generic data (e.g., millions of records of facts) and retrained using some domain-specific data (e.g., hundreds of records of facts specific to the domain of questions expected to be addressed by the dynamic semantic network).

In some example embodiments, input sentences to the double-sided LSTM are represented as a matrix $x=(x_1, x_2, \ldots, x_t)$, wherein each word is represented by a corresponding word vector of a predefined dimension. The output semantic context 230 represents the semantic context meaning at the time t. Thus, the last output $v_t$ represents the meaning of the whole input sentence x.

Figure 3:
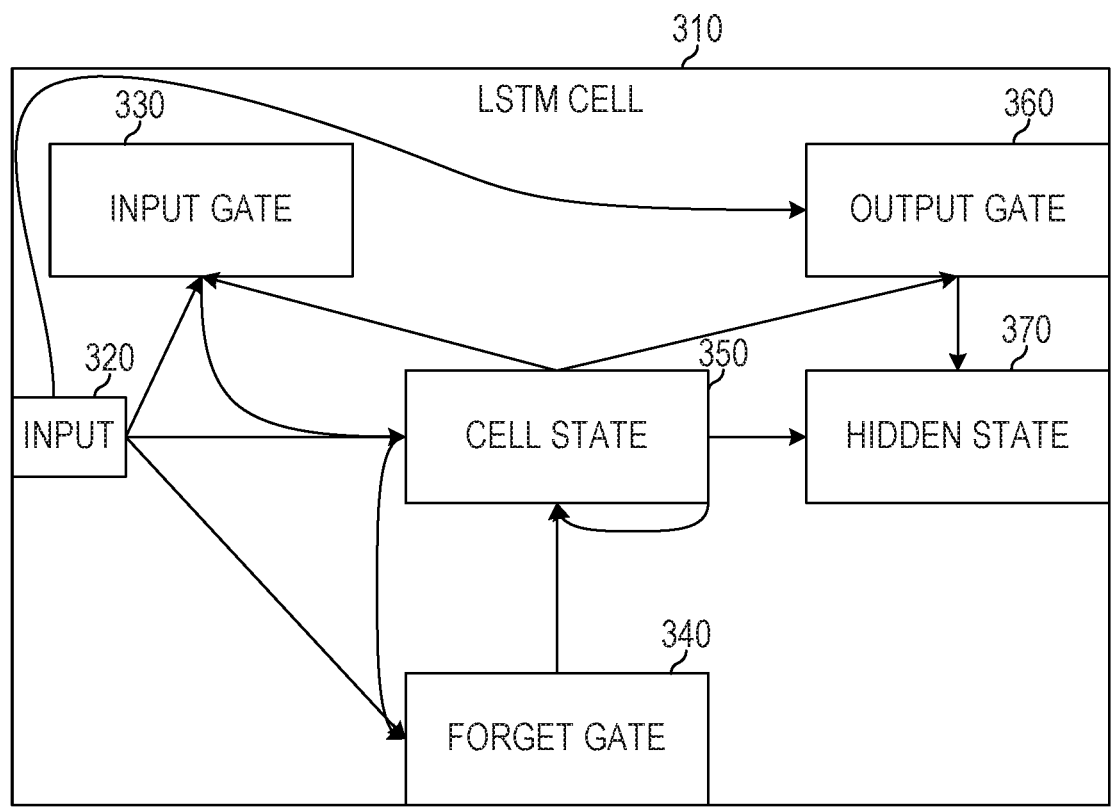
FIG. 3 is a block diagram illustration of a long short-term memory cell, according to some example embodiments.

FIG. 3 is a block diagram illustration of an LSTM cell 310, according to some example embodiments. The LSTM cell 310 includes an input 320, an input gate 330, a forget gate 340, a cell state 350, an output gate 360, and a hidden state 370. The input 320, input gate 330, forget gate 340, cell state 350, output gate 360, and hidden state 370 all have the same vector size. The depicted connections between and among the input 320, the input gate 330, the forget gate 340, the cell state 350, the output gate 360, and the hidden state 370 indicate the dependencies between and among the various values, as further described below. Each of the LSTM cells 220 of FIG. 2 may be implemented as an LSTM cell 310.

An input 320 is received at a time t and provided to the input gate 330, the forget gate 340, the cell state 350, and the output gate 360. The value of each of the input gate 330, the forget gate 340, the cell state 350, the output gate 360, and the hidden state 370 are provided, in some example embodiments, by the equations below. In the equations below, $x_t$ represents the value of the input 320 at time t; $i_t$ represents the value of the input gate 330 at time t; $f_t$ represents the value of the forget gate 340 at time t; $c_t$ represents the value of the cell state 350 at time t; $o_t$ represents the value of the output gate 360 at time t; and $h_t$ represents the value of the hidden state 370 at time t. $\sigma$ is a sigmoid function. $W_{jk}$ represents the weighting factor for the impact of j on k. For example, $W_{xi}$ represents the weight given to the input x on the input gate i. The fixed offset values (or biases) are represented by $b_k$. For example, the bias for the input gate 330 is represented by $b_i$. The weights and biases may be determined by training prior to use of the LSTM cell 310.

$$i_t = \sigma(W_{xi}x_t + W_{hi}h_{t-1} + W_{ci}c_{t-1} + b_i)$$

$$f_t = \sigma(W_{xf}x_t + W_{hf}h_{t-1} + W_{cf}c_{t-1} + b_f)$$

$$c_t = f_t c_{t-1} + i_t \tan h(W_{xc}x_t + W_{hc}h_{t-1} + b_c)$$

$$o_t = \sigma(W_{xo}x_t + W_{ho}h_{t-1} + W_{co}c_t + b_o)$$

$$h_t = o_t \tan h(c_t)$$

Figure 4:
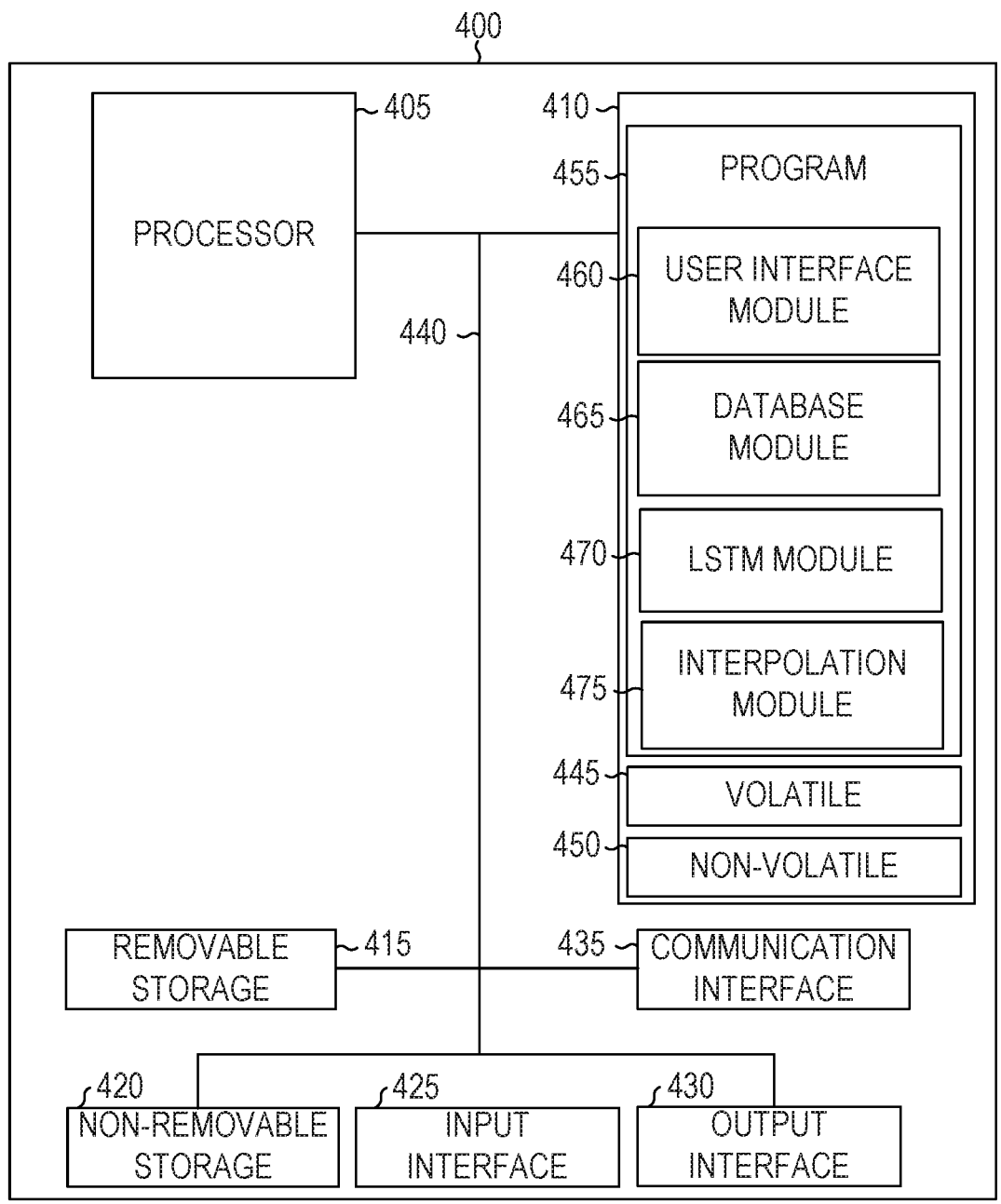
FIG. 4 is a block diagram illustrating circuitry for clients and servers that implement algorithms and perform methods, according to some example embodiments.

FIG. 4 is a block diagram illustrating circuitry for implementing algorithms and performing methods, according to example embodiments. All components need not be used in various embodiments. For example, clients, servers, autonomous systems, and cloud-based network resources may each use a different set of components, or, in the case of servers for example, larger storage devices.

One example computing device in the form of a computer 400 (also referred to as computing device 400 and computer system 400) may include a processor 405, memory storage 410, removable storage 415, and non-removable storage 420, all connected by a bus 440. Although the example computing device is illustrated and described as the computer 400, the computing device may be in different forms in different embodiments. For example, the computing device may instead be a smartphone, a tablet, a smartwatch, or another computing device including elements the same as or similar to those illustrated and described with regard to FIG. 4. Devices such as smartphones, tablets, and smartwatches are generally collectively referred to as "mobile devices" or "user equipment." Further, although the various data storage elements are illustrated as part of the computer 400, the storage may also or alternatively include cloud-based storage accessible via a network, such as the Internet, or server-based storage.

The memory storage 410 may include volatile memory 445 and non-volatile memory 450, and may store a program 455. The computer 400 may include—or have access to a computing environment that includes—a variety of computer-readable media, such as the volatile memory 445, the non-volatile memory 450, the removable storage 415, and the non-removable storage 420. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

The computer 400 may include or have access to a computing environment that includes an input interface 425, an output interface 430, and a communication interface 435. The output interface 430 may interface to or include a display device, such as a touchscreen, that also may serve as an input device. The input interface 425 may interface to or include one or more of a touchscreen, a touchpad, a mouse, a keyboard, a camera, one or more device-specific buttons, one or more sensors integrated within or coupled via wired or wireless data connections to the computer 400, and other input devices. The computer 400 may operate in a networked environment using the communication interface 435 to connect to one or more remote computers, such as database servers. The remote computer may include a personal computer (PC), server, router, network PC, peer device or other common network node, or the like. The communication interface 435 may connect to a local-area network (LAN), a wide-area network (WAN), a cellular network, a WiFi network, a Bluetooth network, or other networks.

Computer-readable instructions stored on a computer-readable medium (e.g., the program 455 stored in the memory storage 410) are executable by the processor 405 of the computer 400. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example.

The program 455 is shown as including a user interface module 460, a database module 465, an LSTM module 470, and an interpolation module 475. Any one or more of the modules described herein may be implemented using hardware (e.g., a processor of a machine, an ASIC, an FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The user interface module 460 provides a user interface and receives user input. For example, a search engine user interface may present a text box on a web page transmitted over a network via the communication interface 435. A user may enter a natural-language query into the text box on a local device and transmit the query over the network for receipt by the communication interface 435 and processing by the user interface module 460. In another example, the user interface module 460 uses the output interface 430 to provide voice prompts via a speaker. In this example, the input interface 425 may receive data from a microphone. The user interface module 460 may include a speech-to-text engine that translates the received voice data to text.

The database module 465 may access a database, knowledge base, or other static memory. The accessed static memory may be stored in the volatile memory 445, non-volatile memory 450, removable storage 415, or non-removable storage 420. In this context, "static memory" refers to the contents of the memory changing infrequently relative to the use of the memory to provide responses to queries. This is distinct from the use of "static memory" to refer to a particular hardware implementation of RAM that does not require refreshing to maintain data storage.

The LSTM module 470 implements one or more LSTM cells. For example, the LSTM module 470 may implement the bidirectional LSTM 120, the multilayer LSTM controller 130, the dynamic memory 150, the double-sided LSTM 200, or any suitable combination thereof.

The interpolation module 475 interpolates an output response based on a plurality of input responses. For example, an output from a static memory may be combined with an output from a dynamic memory via interpolation for output.

Figure 5:
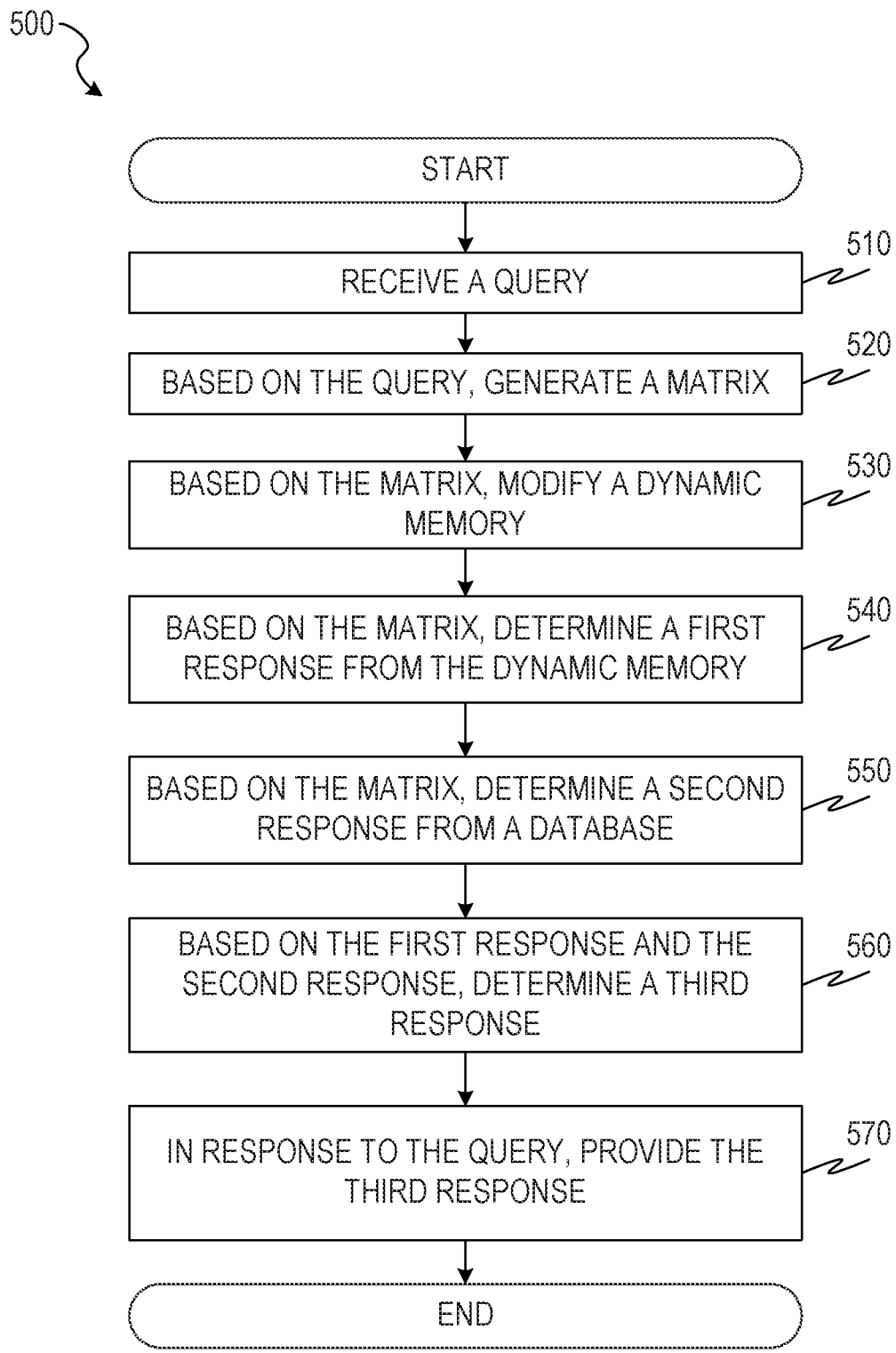
FIG. 5 is a flowchart illustration of a method of using a dynamic semantic network for language understanding and question answering, according to some example embodiments.

FIG. 5 is a flowchart illustration of a method 500 of using a dynamic semantic network for language understanding and question answering, according to some example embodiments. The method 500 includes operations 510, 520, 530, 540, 550, 560, and 570. By way of example and not limitation, the method 500 is described as being performed by elements of the dynamic semantic network 100, described above with respect to FIG. 1, and the computer 400, described above with respect to FIG. 4.

In operation 510, the user interface module 460 receives a query (e.g., a text query comprised of one or more words). Based on the query, in operation 520, the bidirectional LSTM 120 generates a matrix (e.g., a matrix with one column for each word of the query). The matrix may be stored in the volatile memory 445.

In operation 530, the multilayer LSTM controller 130 provides the matrix to the dynamic memory 150 as a write and erase input, modifying the dynamic memory 150. In operation 540, the multilayer LSTM controller 130 provides the matrix to the dynamic memory 150 as a read input, generating a first response.

In operation 550, the multilayer LSTM controller 130 provides the matrix to a database (e.g., the static memory 140) as a read input, generating a second response. In operation 560, the interpolation gate 160 determines a third response based on the first response and the second response.

In operation 570, the user interface module 460 provides, in response to the received query, the third response. For example, a text or audio output may be provided.

Devices and methods disclosed herein may reduce time, processor cycles, and power consumed in providing answers to open-ended questions. For example, processing power required by trained machine learning systems that combine results from static and dynamic memory may consume less power than systems using static or dynamic memory alone (e.g., by requiring less training time, smaller databases, or any suitable combination thereof). Devices and methods disclosed herein may also result in improved question-answering systems, resulting in improved efficiency and an improved user experience.

Although a few embodiments have been described in detail above, other modifications are possible. For example, the logic flows depicted in the figures do not require the particular order shown, or sequential order, to achieve desirable results. Other steps may be provided in, or steps may be eliminated from, the described flows, and other components may be added to, or removed from, the described systems. Other embodiments may be within the scope of the following claims.

What is claimed is:

1. A computer-implemented method of answering questions, comprising:
   accessing an initial database that stores representations of facts as triplets, each triplet comprising a head entity, a relation, and a tail entity;
   generating, from the initial database, a database comprising static memory by performing operations comprising, for each triplet in the initial database:
      generating a first vector based on the head entity and the relation;
      generating a second vector based on the tail entity; and
      storing the first vector and the second vector as a key-value pair, wherein the first vector is the key and the second vector is the value;
   receiving, by one or more processors, a query comprising a plurality of words;
   determining, by the one or more processors, a vector for each word of the plurality of words of the query;
   arranging, by the one or more processors, the vectors for the plurality of words of the query into a matrix;
   based on the matrix, modifying, by the one or more processors, a dynamic memory storing represented facts;
   based on the matrix, determining, by the one or more processors, a first response from the dynamic memory;
   based on the matrix, determining, by the one or more processors, a second response from the database;
   combining, by the one or more processors, the first response and the second response based on an interpolation gate factor that determines a mixture of the first response and the second response to generate a third response; and
   in response to the query, providing, by the one or more processors, the third response.

2. The computer-implemented method of claim 1, wherein:
   the vector for each word of the plurality of words has at least one hundred dimensions; and
   the determining of the vector for each word of the plurality of words comprises retrieving a predetermined corresponding vector for the word from a dictionary database.

3. The computer-implemented method of claim 1, wherein:
   the determining of the first response from the dynamic memory comprises:
   providing the matrix as input to a long short-term memory (LSTM); and
   in response to the input, receiving the first response from the LSTM.

4. The computer-implemented method of claim 1, wherein the determining of the second response from the database comprises determining a cosine similarity between the matrix and one or more keys of the database.

5. The computer-implemented method of claim 4, wherein the determining of the second response from the database further comprises comparing each determined cosine similarity to a predetermined threshold.

6. The computer-implemented method of claim 1, wherein the method further comprises determining the interpolation gate factor using a training set.

7. A question-answering system comprising:
   a memory storage comprising instructions; and
   one or more processors in communication with the memory storage, wherein the one or more processors execute the instructions to perform:
      accessing an initial database that stores representations of facts as triplets, each triplet comprising a head entity, a relation, and a tail entity;
      generating, from the initial database, a database comprising static memory by performing operations comprising, for each triplet in the initial database:
         generating a first vector based on the head entity and the relation;
         generating a second vector based on the tail entity; and storing the first vector and the second vector as a key-value pair, wherein the first vector is the key and the second vector is the value;

receiving a query comprising a plurality of words;

based on the query, determining a vector for each word of the plurality of words of the query;

arranging the vectors for the plurality of words of the query to form a matrix;

based on the matrix, modifying a dynamic memory storing represented facts;

based on the matrix, determining a first response from the dynamic memory;

based on the matrix, determining a second response from the database;

combining the first response and the second response based on an interpolation gate factor that determines a mixture of the first response and the second response to generate a third response; and in response to the query, providing the third response.

8. The system of claim 7, wherein:

the vector for each word of the plurality of words has at least one hundred dimensions; and the determining of the vector for each word of the plurality of words comprises retrieving a predetermined corresponding vector for the word from a dictionary database.

9. The system of claim 7, wherein:

the determining of the first response from the dynamic memory comprises:

providing the matrix as input to a long short-term memory (LSTM); and in response to the input, receiving the first response from the LSTM.

10. The system of claim 7, wherein the determining of the second response from the database comprises determining a cosine similarity between the matrix and one or more keys of the database.

11. The system of claim 10, wherein the determining of the second response from the database further comprises comparing each determined cosine similarity to a predetermined threshold.

12. The system of claim 7, wherein:

the modifying of the dynamic memory comprises applying a weighting function; and the one or more processors further perform:

determining a next value of the weighting function by convolving the weighting function with a shifting distribution.

13. The system of claim 7, wherein the one or more processors further execute the instructions to determine the interpolation gate factor using a training set.

14. A non-transitory computer-readable medium storing computer instructions for answering questions, that when executed by one or more processors, cause the one or more processors to perform steps of:

accessing an initial database that stores representations of facts as triplets, each triplet comprising a head entity, a relation, and a tail entity;

generating, from the initial database, a database comprising static memory by performing operations comprising, for each triplet in the initial database:

generating a first vector based on the head entity and the relation;

generating a second vector based on the tail entity; and storing the first vector and the second vector as a key-value pair, wherein the first vector is the key and the second vector is the value;

receiving a query comprising a plurality of words;

based on the query, determining a vector for each word of the plurality of words of the query;

arranging the vectors for the plurality of words of the query to form a matrix;

based on the matrix, modifying a dynamic memory storing represented facts;

based on the matrix, determining a first response from the dynamic memory;

based on the matrix, determining a second response from the database;

combining the first response and the second response based on an interpolation gate factor that determines a mixture of the first response and the second response to generate a third response; and in response to the query, providing the third response.

15. The non-transitory computer-readable medium of claim 14, wherein:

the vector for each word of the plurality of words has at least one hundred dimensions; and the determining of the vector for each word of the plurality of words comprises retrieving a predetermined corresponding vector for the word from a dictionary database.

16. The non-transitory computer-readable medium of claim 14, wherein the determining of the second response from the database comprises determining a cosine similarity between the matrix and one or more keys of the database.

17. The non-transitory computer-readable medium of claim 14, wherein the one or more processors further determine the interpolation gate factor using a training set.

* * * * *